(12) United States Patent
McVeigh et al.

(10) Patent No.: US 7,483,893 B2
(45) Date of Patent: Jan. 27, 2009

(54) SYSTEM AND METHOD FOR LIGHTWEIGHT LOADING FOR MANAGING CONTENT

(75) Inventors: Ryan Sean McVeigh, Broomfield, CO (US); Steven Leslie Roth, Westminster, CO (US); Jalpesh Patadia, Boulder, CO (US); Tanya Saarva, Boulder, CA (US); Xiaojiang Zhou, Broomfield, CO (US); Brad Posner, Erie, CO (US)

(73) Assignee: BAE Systems, Inc., Redwood Shores, CA (US)

( * ) Notice: Subject to any disclaimer, the term of this patent is extended or adjusted under 35 U.S.C. 154(b) by 244 days.

(21) Appl. No.: 11/499,467

(22) Filed: Aug. 4, 2006

(65) Prior Publication Data

US 2007/0073672 A1 Mar. 29, 2007

Related U.S. Application Data

(60) Provisional application No. 60/720,860, filed on Sep. 26, 2005.

(51) Int. Cl.
G06F 7/00 (2006.01)
G06F 12/00 (2006.01)
G06F 17/00 (2006.01)
G06F 17/30 (2006.01)
G06F 17/28 (2006.01)
G06F 13/00 (2006.01)
G06F 13/28 (2006.01)

(52) U.S. Cl. .............................. 707/5; 707/10; 707/102; 707/104.1; 707/202; 711/113; 715/205

(58) Field of Classification Search ..................... 707/5, 707/10, 102, 104.1, 202, 3; 711/113; 715/205
See application file for complete search history.

(56) References Cited

U.S. PATENT DOCUMENTS 5,237,614 A 8/1993 Weiss
5,335,345 A 8/1994 Frieder et al.

(Continued)

FOREIGN PATENT DOCUMENTS

EP 697662 2/1996

(Continued)

OTHER PUBLICATIONS

An Introduction to BEA WebLogic® Server Security: The New Security Architecture of BEA WebLogic Server™ 7.0, BEA White Paper, May 1, 2002, 20 pages.

(Continued)

*Primary Examiner*—James K Trujillo
*Assistant Examiner*—Jorge A Casanova
(74) *Attorney, Agent, or Firm*—Fliesler Meyer LLP

(57) ABSTRACT

In accordance with embodiments, there are provided mechanisms and methods for providing lightweight loading for managing content in federated content repositories. These mechanisms and methods for providing lightweight loading for managing content in federated content repositories can enable embodiments to provide subset(s) of content determined to satisfy the request from one or more content repositories integrated into a VCR. The ability of embodiments to provide subset(s) of content determined to satisfy the request can enable displaying content responsive to a request in a format appropriate to the requestor's request.

21 Claims, 4 Drawing Sheets

U.S. PATENT DOCUMENTS

| | | |
|---|---|---|
| 5,341,478 A | 8/1994 | Travis, Jr. et al. |
| 5,347,653 A | 9/1994 | Flynn et al. |
| 5,355,474 A | 10/1994 | Thuraisingham et al. |
| 5,369,702 A | 11/1994 | Shanton |
| 5,426,747 A | 6/1995 | Weinreb et al. |
| 5,544,322 A | 8/1996 | Cheng et al. |
| 5,557,747 A | 9/1996 | Rogers et al. |
| 5,619,710 A | 4/1997 | Travis, Jr. et al. |
| 5,627,886 A | 5/1997 | Bowman |
| 5,671,360 A | 9/1997 | Hambrick et al. |
| 5,757,669 A | 5/1998 | Christie et al. |
| 5,806,066 A | 9/1998 | Golshani et al. |
| 5,825,883 A | 10/1998 | Archibald et al. |
| 5,826,000 A | 10/1998 | Hamilton |
| 5,848,396 A | 12/1998 | Gerace |
| 5,867,667 A | 2/1999 | Butman et al. |
| 5,872,928 A | 2/1999 | Lewis et al. |
| 5,873,088 A | 2/1999 | Hiyashi et al. |
| 5,889,953 A | 3/1999 | Thebaut et al. |
| 5,911,143 A | 6/1999 | Deinhart et al. |
| 5,918,210 A | 6/1999 | Rosenthal et al. |
| 5,925,136 A | 7/1999 | Watts |
| 5,941,947 A | 8/1999 | Brown et al. |
| 5,950,195 A | 9/1999 | Stockwell et al. |
| 5,954,798 A | 9/1999 | Shelton et al. |
| 5,956,400 A | 9/1999 | Chaum et al. |
| 5,966,707 A | 10/1999 | Van Huben et al. |
| 5,987,469 A | 11/1999 | Lewis et al. |
| 5,987,611 A | 11/1999 | Freund |
| 6,006,194 A | 12/1999 | Merel |
| 6,014,666 A | 1/2000 | Hellend et al. |
| 6,023,765 A | 2/2000 | Khun |
| 6,029,144 A | 2/2000 | Barrett et al. |
| 6,029,182 A | 2/2000 | Nehab et al. |
| 6,029,196 A | 2/2000 | Lenz |
| 6,054,910 A | 4/2000 | Tada et al. |
| 6,055,515 A | 4/2000 | Consentino et al. |
| 6,073,242 A | 6/2000 | Hardy et al. |
| 6,083,276 A | 7/2000 | Davidson et al. |
| 6,088,679 A | 7/2000 | Barkley |
| 6,098,173 A | 8/2000 | Elgressy et al. |
| 6,108,687 A | 8/2000 | Craig |
| 6,122,647 A | 9/2000 | Horowitz et al. |
| 6,141,010 A | 10/2000 | Hoyle |
| 6,141,686 A | 10/2000 | Jackowski et al. |
| 6,148,333 A | 11/2000 | Guedalia et al. |
| 6,154,844 A | 11/2000 | Touboul et al. |
| 6,157,924 A | 12/2000 | Austin |
| 6,158,010 A | 12/2000 | Moriconi et al. |
| 6,161,139 A | 12/2000 | Win et al. |
| 6,167,407 A | 12/2000 | Nachenberg et al. |
| 6,167,445 A | 12/2000 | Gai et al. |
| 6,167,448 A | 12/2000 | Hemphill et al. |
| 6,169,794 B1 | 1/2001 | Oshimi et al. |
| 6,170,009 B1 | 1/2001 | Mandal et al. |
| 6,178,172 B1 | 1/2001 | Rochberger |
| 6,182,142 B1 | 1/2001 | Win et al. |
| 6,182,226 B1 | 1/2001 | Reid et al. |
| 6,182,277 B1 | 1/2001 | Degroot et al. |
| 6,185,587 B1 | 2/2001 | Bernardo et al. |
| 6,188,399 B1 | 2/2001 | Voas et al. |
| 6,195,696 B1 | 2/2001 | Baber et al. |
| 6,202,066 B1 | 3/2001 | Barkley et al. |
| 6,202,157 B1 | 3/2001 | Brownlie et al. |
| 6,202,207 B1 | 3/2001 | Donohue |
| 6,205,466 B1 | 3/2001 | Karp et al. |
| 6,209,101 B1 | 3/2001 | Mitchem et al. |
| 6,216,134 B1 | 4/2001 | Heckerman et al. |
| 6,216,231 B1 | 4/2001 | Stubblebine |
| 6,226,745 B1 | 5/2001 | Wiederhold |
| 6,233,576 B1 | 5/2001 | Lewis |
| 6,236,991 B1 | 5/2001 | Frauenhofer et al. |
| 6,241,608 B1 | 6/2001 | Torango |
| 6,243,747 B1 | 6/2001 | Lewis et al. |
| 6,253,321 B1 | 6/2001 | Nikander et al. |
| 6,256,741 B1 | 7/2001 | Stubblebine |
| 6,260,050 B1 | 7/2001 | Yost et al. |
| 6,269,393 B1 | 7/2001 | Yost et al. |
| 6,269,456 B1 | 7/2001 | Hodges et al. |
| 6,275,941 B1 | 8/2001 | Saito et al. |
| 6,278,452 B1 | 8/2001 | Huberman et al. |
| 6,285,366 B1 | 9/2001 | Ng et al. |
| 6,285,983 B1 | 9/2001 | Jenkins |
| 6,285,985 B1 | 9/2001 | Horstmann |
| 6,292,900 B1 | 9/2001 | Ngo et al. |
| 6,295,607 B1 | 9/2001 | Johnson |
| 6,301,613 B1 | 10/2001 | Ahlstrom et al. |
| 6,304,881 B1 | 10/2001 | Halim et al. |
| 6,308,163 B1 | 10/2001 | Du et al. |
| 6,317,868 B1 | 11/2001 | Grimm et al. |
| 6,321,336 B1 | 11/2001 | Applegate et al. |
| 6,327,594 B1 | 12/2001 | Van Huben et al. |
| 6,327,618 B1 | 12/2001 | Ahlstrom et al. |
| 6,327,628 B1 | 12/2001 | Anuff |
| 6,336,073 B1 | 1/2002 | Ihara et al. |
| 6,339,423 B1 | 1/2002 | Sampson et al. |
| 6,339,826 B2 | 1/2002 | Hayes, Jr. et al. |
| 6,341,352 B1 | 1/2002 | Child et al. |
| 6,349,297 B1 | 2/2002 | Shaw et al. |
| 6,353,886 B1 | 3/2002 | Howard et al. |
| 6,357,010 B1 | 3/2002 | Viets |
| 6,360,230 B1 | 3/2002 | Chan et al. |
| 6,360,363 B1 | 3/2002 | Moser et al. |
| 6,366,915 B1 | 4/2002 | Rubert et al. |
| 6,377,973 B2 | 4/2002 | Gideon |
| 6,381,579 B1 | 4/2002 | Gervais et al. |
| 6,385,627 B1 | 5/2002 | Cragun |
| 6,393,474 B1 | 5/2002 | Eichert et al. |
| 6,397,222 B1 | 5/2002 | Zellweger |
| 6,397,231 B1 | 5/2002 | Salisbury et al. |
| 6,412,070 B1 | 6/2002 | Van Dyke et al. |
| 6,412,077 B1 | 6/2002 | Roden et al. |
| 6,418,448 B1 | 7/2002 | Sarkar |
| 6,430,556 B1 | 8/2002 | Goldberg et al. |
| 6,434,607 B1 | 8/2002 | Haverstock et al. |
| 6,438,563 B1 | 8/2002 | Kawagoe |
| 6,449,638 B1 | 9/2002 | Wecker et al. |
| 6,457,007 B1 | 9/2002 | Kikuchi et al. |
| 6,460,084 B1 | 10/2002 | Van Horne et al. |
| 6,460,141 B1 | 10/2002 | Olden |
| 6,463,440 B1 | 10/2002 | Hind et al. |
| 6,466,239 B2 | 10/2002 | Ishikawa |
| 6,466,932 B1 | 10/2002 | Dennis et al. |
| 6,473,791 B1 | 10/2002 | Al-Ghosein et al. |
| 6,477,543 B1 | 11/2002 | Huang et al. |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,510,513 B1 | 1/2003 | Danieli |
| 6,519,647 B1 | 2/2003 | Howard et al. |
| 6,530,024 B1 | 3/2003 | Proctor |
| 6,539,375 B2 | 3/2003 | Kawasaki |
| 6,542,993 B1 | 4/2003 | Erfani |
| 6,571,247 B1 | 5/2003 | Danno et al. |
| 6,574,736 B1 | 6/2003 | Andrews |
| 6,581,054 B1 | 6/2003 | Bogrett |
| 6,581,071 B1 | 6/2003 | Gustman et al. |
| 6,584,454 B1 | 6/2003 | Hummel, Jr. et al. |
| 6,587,849 B1 | 7/2003 | Mason et al. |
| 6,587,876 B1 | 7/2003 | Mahon et al. |
| 6,615,218 B2 | 9/2003 | Mandal et al. |
| 6,618,806 B1 | 9/2003 | Brown et al. |
| 7,111,321 B1 | 9/2003 | Watts et al. |

| | | |
|---|---|---|
| 6,633,538 B1 | 10/2003 | Tanaka et al. |
| 6,654,747 B1 | 11/2003 | Van Huben et al. |
| 6,665,677 B1 | 12/2003 | Wotring et al. |
| 6,668,354 B1 | 12/2003 | Chen et al. |
| 6,671,689 B2 | 12/2003 | Papierniak |
| 6,684,369 B1 | 1/2004 | Bernardo et al. |
| 6,694,306 B1 | 2/2004 | Nishizawa |
| 6,697,805 B1 | 2/2004 | Choquier et al. |
| 6,715,077 B1 | 3/2004 | Vasudevan et al. |
| 6,721,888 B1 | 4/2004 | Liu et al. |
| 6,725,333 B1 * | 4/2004 | Degenaro et al. ............ 711/118 |
| 6,728,713 B1 | 4/2004 | Beach et al. |
| 6,732,144 B1 | 5/2004 | Kizu et al. |
| 6,735,586 B2 | 5/2004 | Timmons |
| 6,735,624 B1 | 5/2004 | Rubin et al. |
| 6,735,701 B1 | 5/2004 | Jacobson |
| 6,738,789 B2 | 5/2004 | Multer |
| 6,745,207 B2 | 6/2004 | Reuter et al. |
| 6,751,657 B1 | 6/2004 | Zothner |
| 6,751,659 B1 | 6/2004 | Fenger et al. |
| 6,754,672 B1 | 6/2004 | McLauchlin |
| 6,757,698 B2 | 6/2004 | McBride et al. |
| 6,757,822 B1 | 6/2004 | Feirtag et al. |
| 6,769,095 B1 | 7/2004 | Brassard et al. |
| 6,769,118 B2 | 7/2004 | Garrison et al. |
| 6,772,157 B2 | 8/2004 | Barnett et al. |
| 6,772,332 B1 | 8/2004 | Boebert et al. |
| 6,779,002 B1 | 8/2004 | Mwaura |
| 6,789,202 B1 | 9/2004 | Ko et al. |
| 6,792,537 B1 | 9/2004 | Liu et al. |
| 6,832,313 B1 | 12/2004 | Parker |
| 6,834,284 B2 | 12/2004 | Acker et al. |
| 6,853,997 B2 | 2/2005 | Wotring et al. |
| 6,854,035 B2 | 2/2005 | Dunham et al. |
| 6,856,999 B2 | 2/2005 | Flanagin et al. |
| 6,857,012 B2 | 2/2005 | Sim et al. |
| 6,865,549 B1 | 3/2005 | Connor |
| 6,873,988 B2 | 3/2005 | Herrmann et al. |
| 6,880,005 B1 | 4/2005 | Bell et al. |
| 6,886,100 B2 | 4/2005 | Harrah et al. |
| 6,889,222 B1 | 5/2005 | Zhao |
| 6,901,403 B1 | 5/2005 | Bata et al. |
| 6,904,433 B2 * | 6/2005 | Kapitskaia et al. ............ 707/10 |
| 6,904,454 B2 | 6/2005 | Stickler |
| 6,912,538 B2 | 6/2005 | Stapel et al. |
| 6,917,975 B2 | 7/2005 | Griffin et al. |
| 6,918,088 B2 | 7/2005 | Clark et al. |
| 6,920,457 B2 | 7/2005 | Pressmar |
| 6,922,695 B2 | 7/2005 | Skufca |
| 6,925,487 B2 | 8/2005 | Kim |
| 6,931,549 B1 | 8/2005 | Ananda |
| 6,934,532 B2 | 8/2005 | Coppinger et al. |
| 6,934,699 B1 * | 8/2005 | Haas et al. ...................... 707/2 |
| 6,934,934 B1 | 8/2005 | Osborne |
| 6,947,989 B2 | 9/2005 | Gulotta et al. |
| 6,950,825 B2 | 9/2005 | Chang et al. |
| 6,957,261 B2 | 10/2005 | Lortz |
| 6,961,897 B1 | 11/2005 | Peel et al. |
| 6,965,999 B2 | 11/2005 | Fox et al. |
| 6,970,445 B2 | 11/2005 | O'Neill et al. |
| 6,970,840 B1 | 11/2005 | Yu et al. |
| 6,970,876 B2 | 11/2005 | Hotti et al. |
| 6,978,379 B1 | 12/2005 | Goh et al. |
| 6,985,915 B2 | 1/2006 | Somalwar et al. |
| 6,987,580 B2 | 1/2006 | Watanabe et al. |
| 6,988,138 B1 | 1/2006 | Alcorn et al. |
| 7,003,578 B2 | 2/2006 | Kanada et al. |
| 7,010,537 B2 * | 3/2006 | Eyal et al. .................. 707/100 |
| 7,013,485 B2 | 3/2006 | Brown et al. |
| 7,035,857 B2 | 4/2006 | Reeves et al. |
| 7,035,879 B2 | 4/2006 | Shi et al. |
| 7,035,944 B2 | 4/2006 | Fletcher et al. |
| 7,043,472 B2 | 5/2006 | Aridor et al. |
| 7,043,685 B2 | 5/2006 | Azuma |
| 7,047,522 B1 | 5/2006 | Dixon et al. |
| 7,051,016 B2 | 5/2006 | Winkler |
| 7,051,071 B2 | 5/2006 | Stewart |
| 7,051,316 B2 | 5/2006 | Charisius et al. |
| 7,054,910 B1 | 5/2006 | Nordin et al. |
| 7,062,490 B2 | 6/2006 | Adya et al. |
| 7,062,511 B1 | 6/2006 | Poulsen |
| 7,076,652 B2 | 7/2006 | Ginter et al. |
| 7,080,000 B1 | 7/2006 | Cambridge |
| 7,085,755 B2 | 8/2006 | Bluhm et al. |
| 7,085,994 B2 | 8/2006 | Gvily |
| 7,089,584 B1 | 8/2006 | Sharma |
| 7,093,200 B2 | 8/2006 | Schreiber et al. |
| 7,093,261 B1 | 8/2006 | Harper et al. |
| 7,093,283 B1 | 8/2006 | Chen et al. |
| 7,096,224 B2 | 8/2006 | Murthy et al. |
| 7,111,153 B2 * | 9/2006 | Kuttanna et al. ............ 712/216 |
| 7,124,192 B2 | 10/2006 | High et al. |
| 7,124,413 B1 | 10/2006 | Klemm et al. |
| 7,134,076 B2 | 11/2006 | Bahrs et al. |
| 7,146,564 B2 | 12/2006 | Kim et al. |
| 7,174,563 B1 | 2/2007 | Brownlie et al. |
| 7,185,192 B1 | 2/2007 | Kahn |
| 7,219,140 B2 | 5/2007 | Marl et al. |
| 7,269,664 B2 | 9/2007 | Hutsch et al. |
| 7,272,625 B1 | 9/2007 | Hannel et al. |
| 2001/0009016 A1 | 7/2001 | Hofmann et al. |
| 2001/0032128 A1 | 10/2001 | Kepecs |
| 2001/0034771 A1 | 10/2001 | Hutsch et al. |
| 2001/0034774 A1 | 10/2001 | Watanabe et al. |
| 2001/0039586 A1 | 11/2001 | Primak et al. |
| 2001/0044810 A1 | 11/2001 | Timmons |
| 2001/0047485 A1 | 11/2001 | Brown et al. |
| 2002/0005867 A1 | 1/2002 | Gvily |
| 2002/0010741 A1 | 1/2002 | Stewart |
| 2002/0019827 A1 | 2/2002 | Shiman et al. |
| 2002/0023084 A1 * | 2/2002 | Eyal et al. ...................... 707/3 |
| 2002/0023122 A1 | 2/2002 | Polizzi et al. |
| 2002/0029296 A1 | 3/2002 | Anuff et al. |
| 2002/0046099 A1 | 4/2002 | Frengut et al. |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1 | 6/2002 | Bellare et al. |
| 2002/0087571 A1 | 7/2002 | Stapel et al. |
| 2002/0103818 A1 | 8/2002 | Amberden |
| 2002/0104071 A1 | 8/2002 | Charisius et al. |
| 2002/0107913 A1 | 8/2002 | Rivera et al. |
| 2002/0107920 A1 | 8/2002 | Hotti |
| 2002/0111998 A1 | 8/2002 | Kim |
| 2002/0112171 A1 | 8/2002 | Ginter et al. |
| 2002/0120685 A1 | 8/2002 | Srivastava et al. |
| 2002/0124053 A1 | 9/2002 | Adams et al. |
| 2002/0135617 A1 | 9/2002 | Samid |
| 2002/0143819 A1 | 10/2002 | Han et al. |
| 2002/0147645 A1 | 10/2002 | Alao et al. |
| 2002/0147696 A1 | 10/2002 | Acker |
| 2002/0147801 A1 | 10/2002 | Gullotta et al. |
| 2002/0152267 A1 * | 10/2002 | Lennon ...................... 709/203 |
| 2002/0152279 A1 | 10/2002 | Sollenberger et al. |
| 2002/0161903 A1 | 10/2002 | Besaw |
| 2002/0169893 A1 | 11/2002 | Chen et al. |
| 2002/0169975 A1 | 11/2002 | Good |
| 2002/0173971 A1 | 11/2002 | Stirpe et al. |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0014442 A1 | 1/2003 | Shiigi et al. |
| 2003/0032409 A1 | 2/2003 | Hutcheson et al. |
| 2003/0033315 A1 | 2/2003 | Winkler |
| 2003/0046576 A1 | 3/2003 | High, Jr. et al. |
| 2003/0065721 A1 | 4/2003 | Roskind |

| | | |
|---|---|---|
| 2003/0069874 A1 | 4/2003 | Hertzog |
| 2003/0078959 A1 | 4/2003 | Yeung et al. |
| 2003/0078972 A1 | 4/2003 | Tapissier et al. |
| 2003/0088617 A1 | 5/2003 | Clark et al. |
| 2003/0110448 A1 | 6/2003 | Haut et al. |
| 2003/0115484 A1 | 6/2003 | Moriconi et al. |
| 2003/0120686 A1 | 6/2003 | Kim et al. |
| 2003/0126236 A1 | 7/2003 | Marl et al. |
| 2003/0126464 A1 | 7/2003 | McDaniel et al. |
| 2003/0126558 A1 | 7/2003 | Griffin |
| 2003/0131113 A1 | 7/2003 | Reeves et al. |
| 2003/0135490 A1 | 7/2003 | Barrett et al. |
| 2003/0140308 A1 | 7/2003 | Murthy et al. |
| 2003/0145275 A1 | 7/2003 | Qian et al. |
| 2003/0146937 A1 | 8/2003 | Lee |
| 2003/0167315 A1 | 9/2003 | Chowdry et al. |
| 2003/0167455 A1 | 9/2003 | Iborra et al. |
| 2003/0182577 A1 | 9/2003 | Mocek |
| 2003/0187956 A1 | 10/2003 | Belt et al. |
| 2003/0188085 A1 | 10/2003 | Arakawa et al. |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229501 A1 | 12/2003 | Copeland et al. |
| 2003/0229623 A1 | 12/2003 | Chang et al. |
| 2004/0003071 A1 | 1/2004 | Mathew et al. |
| 2004/0010719 A1 | 1/2004 | Daenen |
| 2004/0019650 A1 | 1/2004 | Auvenshine |
| 2004/0024812 A1 | 2/2004 | Park et al. |
| 2004/0030744 A1 | 2/2004 | Rubin et al. |
| 2004/0030795 A1 | 2/2004 | Hesmer et al. |
| 2004/0064633 A1 | 4/2004 | Oota |
| 2004/0078371 A1 | 4/2004 | Worrall et al. |
| 2004/0093344 A1 | 5/2004 | Berger |
| 2004/0098467 A1 | 5/2004 | Dewey et al. |
| 2004/0098470 A1 | 5/2004 | Kurihara |
| 2004/0098606 A1 | 5/2004 | Tan et al. |
| 2004/0107360 A1 | 6/2004 | Hermann et al. |
| 2004/0125144 A1 | 7/2004 | Yoon |
| 2004/0162733 A1 | 8/2004 | Griffin |
| 2004/0162905 A1 | 8/2004 | Griffin |
| 2004/0162906 A1 | 8/2004 | Griffin |
| 2004/0167880 A1* | 8/2004 | Smith .................. 707/3 |
| 2004/0167899 A1 | 8/2004 | Patadia et al. |
| 2004/0205473 A1 | 10/2004 | Fisher et al. |
| 2004/0205557 A1 | 10/2004 | Bahrs et al. |
| 2004/0215635 A1 | 10/2004 | Chang et al. |
| 2004/0215650 A1 | 10/2004 | Shaji et al. |
| 2004/0230546 A1 | 11/2004 | Rogers |
| 2004/0236760 A1 | 11/2004 | Arkeketa et al. |
| 2004/0243824 A1 | 12/2004 | Jones |
| 2005/0021502 A1 | 1/2005 | Chen et al. |
| 2005/0021656 A1 | 1/2005 | Callegari |
| 2005/0050184 A1 | 3/2005 | Boden et al. |
| 2005/0060324 A1 | 3/2005 | Johnson et al. |
| 2005/0086206 A1 | 4/2005 | Balasubramanian et al. |
| 2005/0086469 A1 | 4/2005 | Dunagan et al. |
| 2005/0097008 A1 | 5/2005 | Ehring et al. |
| 2005/0198617 A1 | 9/2005 | Kim et al. |
| 2005/0256894 A1 | 11/2005 | Talanis et al. |
| 2005/0257267 A1 | 11/2005 | Williams et al. |
| 2006/0005150 A1 | 1/2006 | Pankovcin |
| 2006/0059107 A1 | 3/2006 | Elmore et al. |
| 2006/0085412 A1 | 4/2006 | Johnson et al. |
| 2006/0122882 A1 | 6/2006 | Brown et al. |
| 2006/0167858 A1 | 7/2006 | Dennis et al. |
| 2006/0167935 A1* | 7/2006 | Atarashi et al. .......... 707/104.1 |
| 2006/0225123 A1 | 10/2006 | Childress et al. |
| 2006/0277594 A1 | 12/2006 | Chiavegatto et al. |
| 2007/0083484 A1 | 4/2007 | McVeigh et al. |
| 2007/0294743 A1 | 12/2007 | Kaler et al. |

FOREIGN PATENT DOCUMENTS

| | | |
|---|---|---|
| EP | 1 256 889 | 11/2002 |
| WO | 00/38078 | 6/2000 |
| WO | 01/14962 | 3/2001 |
| WO | 01/67285 | 9/2001 |
| WO | 01/77823 | 10/2001 |
| WO | 02/063496 | 8/2002 |
| WO | 02/075597 | 9/2002 |

OTHER PUBLICATIONS

"Combined-User Interface for Computers, Television, Video Recorders, and Telephone, etc . . . ," IBM Technical Disclosure Bulletin, US, pp. 116-118 (Aug. 1990).

"Guide to Using the BEA E-Business Control Center," BEA Web Logic Portal, Version 4.0 (Oct. 2001) 356 pages.

"Method and System for Visually Constructing Document Type Definitions and Related Artifacts Using a Reusable Object Model," IBM Technical Disclosures Bulletin, May 31, 2001, 3 pages.

Adomavicius, Gediminas, et al., "User Profiling in Personalization Applications Through Rule Discovery and Validation," KDD '99, San Diego, CA, US, ACM, pp. 377-381(1999).

Adya, Atul, et al., "Farsite: Federated, Available, and Reliable Storage for an Incompletely Trusted Environment," ACM SIGOPS Operating Systems Review, vol. 36, Issue S1 (Winter 2002), OSDI '02, Proceedings of the 5th Symposium on Operating Systems Design and Implementation, pp. 1-14.

Ahn, Gail-Joon, et al. Role-Based Authorization Constraints Specification Using Object Constraint Language, IEEE, pp. 157-162 (2001).

Atkins, David L., et al., "MAWL: A Domain Specific Language for Form-Based Services," IEEE Transactions on Software Engineering, IEEE Service Center, Los Alamitos, CA, US, vol. 25, No. 3, pp. 334-346 (May 1999).

Ayers, Danny et al., "Professional Java Server Programming," Wrox Press, Ltd., Birmingham, UK, Dec. 1999, pp. 515-545.

Barrett, Alexandra, "Trying Out Transactions", SunExpert Magazine, Jan. 1999, pp. 57-59.

BEA Systems, "WebLogic Server™ 6.1 has been released," The ServerSide.com, Sep. 13, 2001, 6 pages.

BEA WebLogic Portal-Development Guide, Release 7.0, Service Pack 1, Document Date Dec. 2002, 626 pages.

BEA WebLogic Server™, "Assembling and Configuring Web Applications," BEA Systems Release 7.0, Revised Aug. 20, 2002, 165 pages.

BEA WebLogic Server™, "Developing Security Providers for WebLogic Server," BEA Systems Release 7.0, Revised Aug. 30, 2002, 315 pages.

BEA WebLogic Server™, "Introduction to WebLogic Security," BEA Systems Release 7.0, Document Date Jun. 2002, Revised Jun. 28, 2002, 22 pages.

Bertino, Elisa, et al., "TRBAC: A Temporal Role-Based Access Control Model," ACM Transactions on Information and System Security (TISSEC), vol. 4, Issue 3, pp. 191-223 (Aug. 2001).

Browne, Shirley V., et al., Reuse Library Interoperability and the World Wide Web, ACM, pp. 182-189 (1997).

Browne, Shirley, et al. "Location-Independent Naming for Virtual Distributed Software Repositories,"ACM Symposium on Software Reusability, Seattle, WA, US, vol. 20, Issue SI, pp. 179-185 (Aug. 1995).

Browne, Shirley, et al., "Technologies for Repository Interoperation and Access Control," ACM, pp. 40-48 (1995).

Candan, K.S., et al. "Enabling Dynamic Content Caching for Database-Driven Websites," Proceedings of the 2001 ACM SIGMOD International Conference on Management of Data, Santa Barbara, CA, US, pp. 532-543 (2001).

Catley, Christina, et al. "Design of a Health Care Architecture for Medical Data Interoperability and Application Integration," Proceedings of the Second Joint EMBS/BMES Conference, Houston, TX, US, Oct. 23-26, 2002, IEEE, vol. 3, pp. 1952-1953.

Cingil, Ibrahim, et al., "A Broader Approach to Personalization," Communications of the ACM, vol. 43, No. 6, pp. 136-141 (Aug. 2000).

Costello, S., "Baltimore to Release SelectAccess 5.0 with SAML," Apr. 24, 2002, www.infoworld.com/articles/hn/xml/02/02/24/020424hnsaml.html, printed Feb. 17, 2006.

Covington, Michael J., et al., "Securing Context-Aware Applications Using Environment Roles," ACM Workshop on Role Based Access Control, Proceedings of the Sixth ACM Symposium on Access Control Models and Technologies, pp. 10-20 (2001).

Faden, Glenn, "RBAC in UNIX Administration," ACM Workshop on Role-Based Access Control, pp. 95-101 (1999).

First Data Chooses Baltimore SelectAccess to Secure Extranet Applications, Mar. 5, 2002, 2 pages.

Ford, Nigel, "Web Developer.com Guide to Building Intelligent Web Sites with JavaScript," Wiley Computer Publishing, NY, 1998, pp. 65-86, 96-98, 245-250 and 324-327.

Freudenthal, Eric, et al., "dRBAC: Distributed Role-Based Access Control for Dynamic Coalition Environments," Proceedings of the 22nd International Conference on Distributed Computing Systems (ICDCS '02) IEEE 2002, 10 pages.

Georgiadis, Christos K., et al., "Flexible Team-Based Access Control Using Contexts," ACM Workshop on Role Based Access Control, Proceedings of the Sixth ACM Symposium on Access Control Methods and Technologies, pp. 21-27 (2001).

Goh, Cheh, et al., "Towards a more Complete Model of Role," Symposium on Access Control Models and Technologies, Proceedings of the Third ACM Workshop on Role-Based Access Control, pp. 55-61 (1998).

Gustafsson, Mats, et al., "Using NFS to Implement Role-Based Access Control," IEEE, pp. 299-304 (1997).

Hayton, R.J., et al., "Access Control in an Open Distributed Environment," 12 pages (1998).

Howes, T., "The String Representation of LDAP Search Filters," © The Internet Society, RFC 2254, 8 pages (Dec. 1997).

Hunter, Jason, "Java Servlet Programming," second edition, O'Reilly, Apr. 11, 2001, 20 pages.

International Search Report and Written Opinion for PCT/US04/04079 dated Aug. 24, 2004, 6 pages.

International Search Report and Written Opinion for PCT/US04/04691 dated Sep. 24, 2004, 6 pages.

International Search Report for PCT/US02/34006, dated Jan. 13, 2003, 3 pages.

International Search Report for PCT/US02/34007, dated Jan. 21, 2003, 3 pages.

International Search Report for PCT/US02/34008, dated Dec. 31, 2002, 5 pages.

International Search Report for PCT/US02/34048, dated Dec. 23, 2002, 2 pages.

International Search Report for PCT/US02/34088, dated Mar. 7, 2003, 3 pages.

International Search Report for PCT/US02/34089, dated Feb. 19, 2003, 4 pages.

International Search Report for PCT/US02/34308, dated Mar. 5, 2003, 4 pages.

International Search Report for PCT/US02/34309, dated Feb. 14, 2003, 4 pages.

International Search Report for PCT/US04/04078, dated Dec. 15, 2005, 2 pages.

International Search Report for PCT/US04/04140, dated Dec. 27, 2005, 2 pages.

IPER for PCT/US02/11969, dated Dec. 1, 2004, 2 pages.

Joshi, J., et al., "Security Models for Web-Based Applications," Communications of the ACM, vol. 44, No. 2, pp. 38-44 (2001).

Kistler, Thomas, et al., "WebL—a Programming Language for the Web," Computer Networks and ISDN Systems, North Holland Publishing, Amsterdam, NL, vol. 30, No. 1-7, pp. 259-270 (Apr. 1998).

Lee, Amy J., et al., "Keeping Virtual Information Resources up and Running," IBM Press, pp. 1-14 (Nov. 1997).

Levy, Michael R., "Web Programming in Guide," Software Practice & Experience, Wiley & Sons, Bognor Regis, GB, vol. 28, No. 15, Dec. 25, 1998, pp. 1581-1603.

Microsoft Computer Dictionary, 4th Edition, Microsoft Press, Redmond, WA, p. 489 (1999).

Microsoft Computer Dictionary, 5th Edition, Microsoft Press, Redmond, WA, pp. 115, 176 and 542 (2002).

Microsoft Windows ("Windows Explorer") copyright 1981-2001, 3 pages.

Moore, Bill et al., "Migrating Weblogic Applications to WebSphere Advanced Edition", IBM Redbooks, pp. 1, 3-4, 109-111 and 181-195 (Jan. 2001).

Moran et al., "Multimodal User Interfaces in the Open Agent Architecture", ACM 0-89791-839-8/96/01, IUI, Orlando, Florida USA (1997) pp. 61-68.

Na, Sang Yeob, et al., "Role Delegation in Role-Based Access Control," ACM Workshop on Role-Based Access Control, RBAC, Berlin, Germany, pp. 39-44 (2000).

Nuescheler, David, et al., "Java Content Repository-JSR-170," version 0.1, Apr. 24, 2002, version 0.2 May 10, 2004, version 0.3 May 17, 2002, version 0.4 Jul. 17, 2002, version 0.5 Sep. 16, 2002, and version 0.6 Nov. 26, 2002, pp. 1-99.

Oh, Sejong, et al., "Enterprise Model as a Basis of Administration on Role-Based Access Control," IEEE, pp. 150-158 (2001).

Okamoto, Eiji, "Proposal for Integrated Security Systems," IEEE Computer Society Press, pp. 354-358 (Jun. 1992).

Park, Joon S., "Role-Based Access Control on the Web," ACM Transactions on Information and System Security, vol. 4, No. 1, pp. 37-71(Feb. 2001).

Parker, Elisabeth, "The Complete Idiot's Guide® to Microsoft® FrontPage 2000", QUE®, Indianapolis, IN, pp. 7 and 52 (1999).

Rossi, Gustavo, et al., "Designing Personalized Web Applications," ACM, WWW 10, Hong Kong, May 1-5, 2001, pp. 275-284.

Rouff, "Formal Specification of User Interfaces", SIGHIC Bulletin, vol. 28, No. 3 (Jul. 1996) pp. 27-33.

Sandhu, Ravi S., et al., "Role-Based Access Control Models," IEEE Computer, vol. 29, No. 2, pp. 38-47 (1996).

Sandhu, Ravi S., et al., "The ARBAC97 Model for Role-Besed Administration of Roles," ACM Transactions on Information and System Security vol. 2, No. 1, pp. 105-135 (Feb. 1999).

Sandhu, Ravi S., et al., "The RRA97 Model for Role-Based Administration of Role Hierarchies," ACSAC, pp. 39-49 (1998).

Shim, Won Bo, et al. "Implementing Web Access Control System for the Multiple Web Servers in the Same Domain Using RBAC Concept," IEEE, pp. 768-773 (2001).

Stephanidis, Constantine, et al., "Decision Making in Intelligent User Interfaces," IUI '97, Orlando, FL, US, ACM, pp. 195-202 (1997).

Stiemerling, Oliver, et al., "How to Make Software Softer—Designing Tailorable Applications," DIS '97, Amsterdam, The Netherlands, ACM, pp. 365-376 (1997).

Sunsted, Todd, "JNDI Overview, Part 1: An Introduction to Naming Services", JavaWorld, Jan. 2000, pp. 1-6, (downloaded from www.javaworld.com/javaworld/jw-01-2000/jw-01-howto_p.html).

Supplementary European Search Report for EP 01 97 5484 dated Dec. 19, 2006 (2 pages).

Supplementary European Search Report for EP 02 7238740.0 dated Jun. 7, 2006 (3 pages).

Supplementary European Search Report for EP 02 773915.0 dated Oct. 12, 2006 (3 pages).

Symborski, Carl W., "Updating Software and Configuration Data in a Distributed Communications Network," IEEE Computer Networking Symposium, pp. 331-338 (1988).

Tanyi, Emmanuel, "Easy XML," www.winsite.com, pp. 1-6 (Mar. 2000).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, Oct. 5, 2001, pp. 52-55.

USDatacenters . . . eBusiness, Business Wire, Apr. 4, 2001, p. 2079.

Visveswaran, Siva, "Dive into Connection Pooling with J2EE," reprinted from JavaWorld, 7 pages (Oct. 2000).

Yao, Walt, et al., "A Model of Oasis Role-Based Access Control and its Support for Active Security," ACM Workshop on Role Based Access Control, Proceedings of the Sixth ACM Symposium on Access Control Methods and Technologies, pp. 171-181 (2001).

Zhang, Zheng, et al., "Designing a Robust Namespace for Distributed File Services," Reliable Distributed System, Proceedings 20th IEEE Symposium on Oct. 28-31, 2001, pp. 162-171.

* cited by examiner

US 7,483,893 B2

SYSTEM AND METHOD FOR LIGHTWEIGHT LOADING FOR MANAGING CONTENT

CLAIM OF PRIORITY

This application claims the benefit of U.S. Provisional Patent Application No. 60/720,860 entitled IMPROVED CONTENT MANAGEMENT, by Ryan McVeigh et al., filed Sep. 26, 2005, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/525,394 entitled SYSTEM AND METHOD FOR PROVIDING DISPLAY TEMPLATES FOR CONTENT MANAGEMENT, by Ryan McVeigh et al., filed on Sep. 22, 2006.

FIELD OF THE INVENTION

The current invention relates generally to managing content for use with portals and other content delivery mechanisms, and more particularly to a mechanism for lightweight loading for managing content in federated content repositories.

BACKGROUND

Content repositories manage and provide access to large data stores such as a newspaper archives, advertisements, inventories, image collections, etc. A content repository can be a key component of a web application such as a portal, which must quickly serve up different types of content in response to user interaction. However, difficulties can arise when trying to integrate more than one vendor's content repository. Each may have its own proprietary application program interface and content services (e.g., conventions for searching and manipulating content, versioning, lifecycles and data formats). Furthermore, each time a repository is added to an application, the application software must be modified to accommodate these differences. What is needed is a coherent system and method for interacting with disparate repositories and for providing a uniform set of content services across all repositories, including those that lack such services.

DETAILED DESCRIPTION

Figure 1:
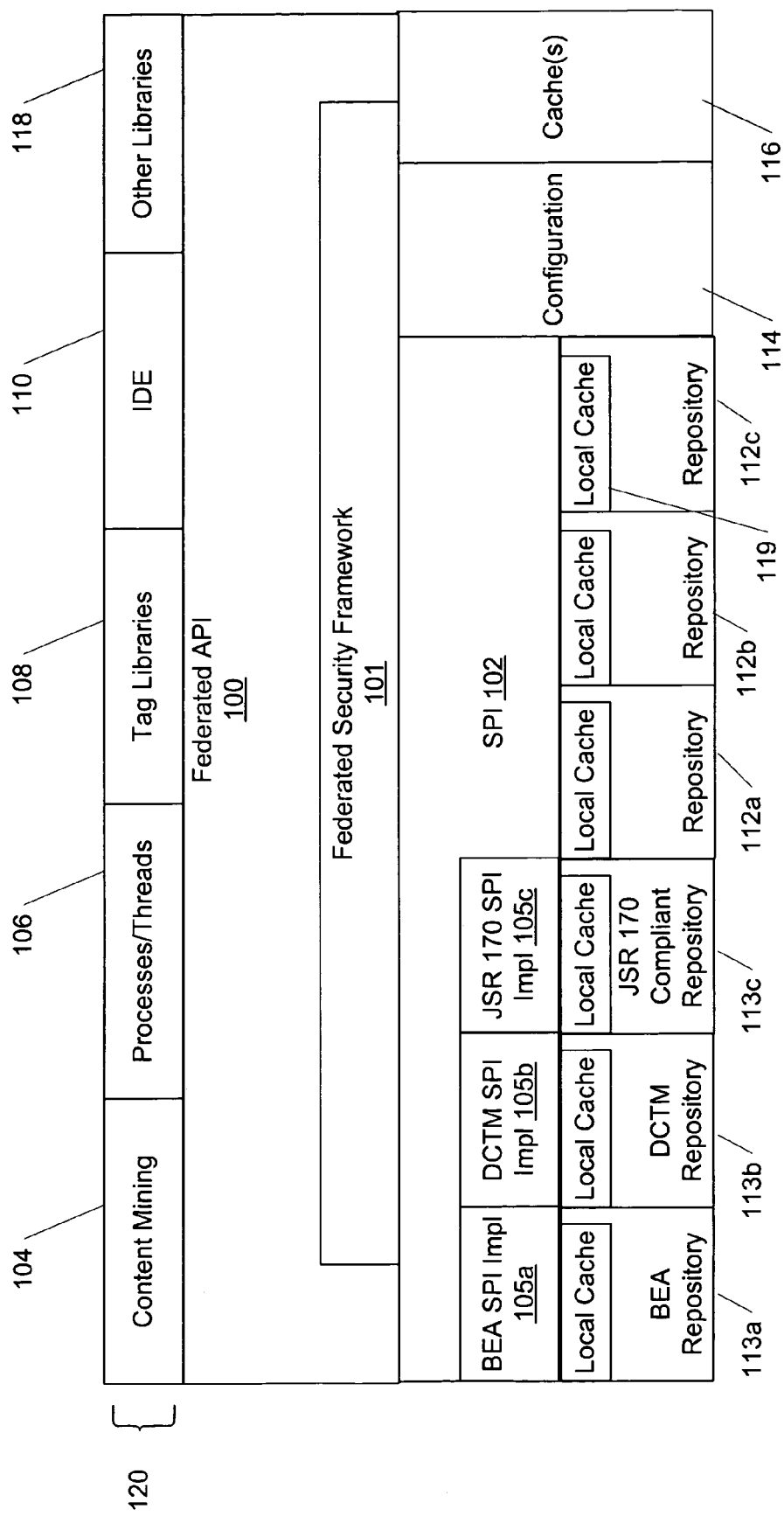
FIG. 1 is an illustration of functional system layers in various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for providing lightweight loading for managing content in federated content repositories. These mechanisms and methods for providing lightweight loading for managing content in federated content repositories can enable embodiments to provide subset(s) of content determined to satisfy the request from one or more content repositories integrated into a VCR. The ability of embodiments to provide subset(s) of content determined to satisfy the request can enable displaying content responsive to a request in a format appropriate to the requestor's request.

In an embodiment and by way of example, a method for providing lightweight loading for managing content in federated content repositories in a content management system is provided. A method embodiment includes receiving a request to access content stored in at least one of a plurality of content repositories via a common Application Programming Interface (API). Each one of the plurality of content repositories is integrated into a virtual content repository (VCR). The method also includes retrieving only a subset of content determined to satisfy the request from at least one of the plurality of content repositories. The subset is capable of being displayed to the requestor according to one of a paged result display model and a paged list display model. Further, the subset of the content is selected based upon a selection criterion specific to the at least one of the plurality of content repositories. By way of example and without limitation, this can include determining a subset of content that satisfies the request based upon a selection criteria selected from at least one of a paged result model and a paged list model. The method also includes providing the subset of content when information responsive to the request is to be displayed.

Embodiments can provide one or more of: a) faster retrievals of results for the first page (by loading less data initially); b) Sortable and Filterable 'features', which in certain cases, such as for existing non-BEA SPI implementations, includes rendering (i.e., loading all results into memory, then sorting); c) smaller amounts of data associated with a Paged Result (which typically will be stored in the session); and d) an architecture which supports future lightweight pagination performance improvements.

As used herein, the term result set is defined broadly as any result provided by one or more services. Result sets may include multiple entries into a single document, file, communication or other data construct. As used herein, the term (unbounded) result set may be represented as either a paged list or a paged result. Both support filtering and sorting features. As used herein, the term Paged Result model includes paged models focused on a paging result set, and that have the concept of a page, next page, previous page, etc. Paged Result Models are useful in user interface interactive applications, for example. Principle benefits of Paged Result Models are 'loading in chunks' and 'faster loading', inter alia. For example, API methods may be called which return Paged Result objects. The Paged Result objects may be examined in their entirety and discarded before the request completes or stored in a cache for subsequent examination. Embodiments may return only the first n pages of search results to be examined. This usage behavior may be used to improve performance and scalability by limiting the initial query and loading less detailed information, however, this is preferably transparent—the search results must always be correct.

An example Paged Result model embodiment supports sorting and filtering on multiple criteria (not just one), as well as using both the sorting and filtering features at the same time. It is noteworthy that the sorting and filtering features can also apply to the Page List result set model described herein below. A related form is the Sortable Paged Result, in which the caller is provided the capability to sort the result by an attribute. The admin tools client can use this feature to sort the tables of data by a column, for example. Another form, the Filterable Paged Result is a Paged Result that allows the caller to filter the result by an attribute, i.e., 'startswith,' 'contains,' etc. This form behaves like a simple search within existing results. The admin tools client can use this feature to filter the tables of data by a column value, for example.

As used herein the term Paged list model includes paged models focused on a 'virtual' result set, such as a list of items that have no concept of a page. Paged list models are useful for non-interactive applications, such as automated processing of a result set, for example. From a VCR client perspective, a page list looks just like a standard result set. A benefit that paged list models provide is that due to underlying lightweight loading, the result set is loaded in chunks, rather than all at once. This provides faster response times. This approach may be used in runtime portal (commerce) applications, for example. It is possible to create a Paged Result model from a Page dList model and vice-versa.

In embodiments, result sets (paged list or paged result) may be re-filtered and/or re-sorted, and filtering and/or sorting can also be independently applied, modified, and removed. For example, a user can start out with all node search results of type Article, apply a filter for all Article node results starting with 'X', sort the Article results by modification date (all Article nodes starting with 'X', sorted by mod date), remove the 'X' filtering (now all Article results present, still sorted by modification date), re-sort by type name (now all Article results present, sorted by type name), and finally remove the sort. (now all Article results present, possibly unsorted).

Embodiments may also provide one or more of customer sorting and filtering of paged results, a default sorting and filtering, a property sorting/filtering, a property type sorting and filtering, and object sorting and filtering. In embodiments, the order of sorting and filtering may be governed by precedence rules, which may be user definable.

While the present invention is described with reference to an embodiment in which techniques for providing lightweight loading for managing content to federated content repositories are implemented in an application server in conformance with the J2EE Management Framework using executable programs written in the Java™ programming language, the present invention is not limited to the J2EE Management Framework nor the Java™ programming language. Embodiments may be practiced using other interconnectivity specifications or programming languages, i.e., JSP and the like without departing from the scope of the embodiments claimed. (Java™ is a trademark of Sun Microsystems, Inc.).

FIG. 1 is an illustration of functional system layers in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A content repository 112 represents a searchable data store. Such systems can relate structured content and unstructured content (e.g., digitally scanned paper documents, Extensible Markup Language, Portable Document Format, Hypertext Markup Language, electronic mail, images, video and audio streams, raw binary data, etc.) into a searchable corpus. Content repositories can be coupled to or integrated with content management systems. Content management systems can provide for content workflow management, versioning, content review and approval, automatic content classification, event-driven content processing, process tracking and content delivery to other systems. By way of illustration, if a user fills out a loan application on a web portal, the portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") is a logical representation of one or more individual content repositories. For example, the VCR provides a single access point to multiple repositories from the standpoint of application layer 120 but does not shield from the user that there is more than one repository available. The VCR can also add content services to repositories that natively lack them. Typically, the user interacts with the VCR by specifying which repository an action is related to (such as adding a new node), or performing an action that applies to all repositories (such as searching for content). In various embodiments and by way of illustration, this can be accomplished in part by use of an API (application program interface) 100 and an SPI (service provider interface) 102. An API describes how entities in the application layer can interface with some program logic or functionality. The application layer can include applications (and subdivisions thereof) that utilize the API, such as processes, threads, servlets, portlets, objects, libraries, and other suitable application components. An SPI describes how a service provider (e.g., a content repository, a content management system) can be integrated into a system of some kind. The SPI isolates direct interaction with repositories from the API. In various embodiments, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

Embodiments described herein include examples of techniques for providing lightweight loading for managing content. Lightweight loading techniques enable providing information from a VCR of integrated content repositories in manageable portions using a paged result model or a paged list model. Embodiments are enabled to determine a subset of content that satisfies a received request based upon a selection criteria selected from at least one of a paged result model and a paged list model. In an embodiment, an application making the request indicates the desired selection criterion upon which selection from at least one of a paged result model and a paged list model. In an embodiment the subset of content provided for display may be provided according to an ordering. The subset of content may be ordered according to one or more of a relevance criterion, a sorting, an ordering by repository, an ordering by a type of a node within the VCR, an ordering by a version identifier associated with at least a portion of the content. In an embodiment, a query to be applied to the subset of content is received. The subset of content is filtered according to the query to provide a filtered subset, which is provided responsive to the query. In a yet further embodiment, the filtered subset of content may be provided according to an ordering. The filtered subset of content may be ordered according to one or more of: a relevance criterion, a sorting, an ordering by repository, an ordering by a type of a node within the VCR, an ordering by a version identifier associated with at least a portion of the content.

Content repositories may comprise a variety of interfaces for connecting with the repository. For example, as shown in FIG. 1, a BEA format repository 113a provided by BEA Systems, Inc. of San Jose, Calif., a Documentum™ format repository 113b, provided by EMC Corp. of Hopkinton, Mass., and a JSR-170 compliant repository 113c may be integrated into a VCR and made accessible via a single federated API 100 by SPI 102. Individual SPI implementations 105a, 105b, 105c provide format specific service provider interfaces to the BEA format repository 113a, the Documentum™ format repository 113b, and the JSR-170 format repository 113c, respectively. It is noteworthy that not all of the formats illustrated in FIG. 1 will be present in all embodiments. Further, some embodiments will include other repository formats not illustrated by FIG. 1 for brevity.

API's and SPI's can be specified as a collection of classes/interfaces, data structures and/or methods/functions that work together to provide a programmatic means through which VCR service(s) can be accessed and utilized. By way of illustration, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, and other suitable means.

In various embodiments, the API presents a unified view of all repositories to the application layer such that navigation, CRUD operations (create, read, update, delete), versioning, workflows, and searching operations initiated from the application layer operate on the repositories as though they were one. Repositories that implement the SPI can "plug into" the VCR. The SPI includes a set of interfaces and services that support API functionality at the repository level. The API and SPI share a content model that represents the combined content of all repositories as a hierarchical namespace of nodes. Given a node N, nodes that are hierarchically inferior to N are referred to as children of N, whereas nodes that are hierarchically superior to N are referred to as parents of N. The topmost level of the hierarchy is termed the federated root. There is no limit to the depth of the hierarchy. In various embodiments, repositories are children of the federated root. Each repository can itself have children.

By way of illustration, content mining facilities 104, processes/threads 106, tag libraries 108, integrated development environments (IDEs) 110, and other libraries 118 can all utilize the API to interact with a VCR. An IDE can provide the ability for a user to interactively build workflows and/or content views. Content mining facilities can include services for automatically extracting content from the VCR based on parameters. Java ServerPages™ tag libraries enable portals to interact with the VCR and surface its content on web pages. (Java ServerPages™ is available from Sun Microsystems, Inc.) In addition, it will be apparent to those of skill in the art that many other types of applications and software components utilize the API and are, as such, fully within the scope and spirit of the present disclosure.

In various embodiments, the API can include optimizations to improve the performance of interacting with the VCR. One or more caches 116 can be used to buffer search results and/or recently accessed nodes. Some implementations may include additional cache 119 in one or more repositories. In various embodiments, a cache can include a node cache and/or a binary cache. A node cache can be used to provide fast access to recently accessed nodes whereas a binary cache can be used to provide fast access to the binary content/data associated with each node in a node cache. The API can also provide a configuration facility 114 to enable applications, tools and libraries to configure caches and the VCR. In various embodiments, this facility can be can be configured via Java Management Extension (JMX) (available from Sun Microsystems, Inc.).

In various embodiments, a model for representing hierarchy information, content and data types is shared between the API and the SPI. In this model, a node can represent hierarchy information, content or schema information. Hierarchy nodes can serve as containers for other nodes in the namespace akin to a file subdirectory in a hierarchical file system. Schema nodes represent predefined data types. Content nodes represent content/data. Nodes can have a shape defined by their properties. A property associates a name, a data type and an optional a value that is appropriate for the type. In certain of these embodiments, the properties of content nodes contain values. By way of an illustration, a type can be any of the types described in Table 1. Those of skill in the art will appreciate that many more types are possible and fully within the scope and spirit of the present disclosure.

TABLE 1

Exemplary Property Types in Various Embodiments

| PROPERTY TYPE | DESCRIPTION |
| --- | --- |
| Basic | Text, a number, a date/time, a Boolean value, a choice, an image, a sound, a bit mask, an audio/visual presentation, binary data. |
| Link | A pointer/reference to data that lives "outside" of a node. |
| Lookup | An expression to be evaluated for locating another node in the VCR |
| Database Mapped (or schema) | Maps to an existing database table or view. |
| Nested | One or more schemas define individual properties. |

In various embodiments, a property can also indicate whether it is required, whether it is read-only, whether it provides a default value, and whether it specifies a property choice. A property choice indicates if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. A property can also be designated as a primary property. By way of illustration, the primary property of a node can be considered its default content. For example, if a node contained a binary property to hold an image, it could also contain a second binary property to represent a thumbnail view of the image. If the thumbnail view was the primary property, software applications such as browser could display it by default.

A named collection of one or more property types is a schema. A schema node is a place holder for a schema. In various embodiments, schemas can be used to specify a node's properties. By way of illustration, a Person schema with three properties (Name, Address and DateofBirth) can be described for purposes of discussion as follows:

Schema Person = {
<Name=Name, Type=Text>,
<Name=Address, Type=Address>,
<Name=DateofBirth, Type=Date>}

Various embodiments allow a node to be defined based on a schema. By way of illustration, a content node John can be given the same properties as the schema Person:

Content Node John is a Person

In this case, the node John would have the following properties: Name, Address and DateofBirth. Alternatively, a node can use one or more schemas to define individual properties. This is sometimes referred to as nested types. In the following illustration, John is defined having an Info property that itself contains the properties Name, Address and DateofBirth. In addition, John also has a CustomerId property:

Content Node John = {
<Name=Info, Type=Person>,
<Name=CustomerId, Type=Number> }

Schemas can be defined logically in the VCR and/or in the individual repositories that form the VCR. In certain embodiments, schemas can inherit properties from at least one other schema. Schema inheritance can be unlimited in depth. That is, schema A can inherit from schema B, which itself can inherit from schema C, and so on. If several schemas contain repetitive properties, a "base" schema can be configured from which the other schemas can inherit. For example, a Person schema containing the properties Name, Address and DateofBirth, can be inherited by an Employee schema which adds its own properties (i.e., Employee ID, Date of Hire and Salary):

Schema Employee inherits from Person = {
<Name=EmployeeID, Type= Number>,
<Name=DateofHire, Type=Date>,
<Name=Salary, Type= Number> }

Thus, as defined above the Employee schema has the following properties: Name, Address, DateofBirth, EmployeeID, DateofHire and Salary. If the Person schema had itself inherited properties from another schema, those properties would also belong to Employee.

In various embodiments, nodes have names/identifiers and can be specified programmatically or addressed using a path that designates the node's location in a VCR namespace. By way of illustration, the path can specify a path from the federated root ('/') to the node in question ('c'):

/a/b/c

In this example, the opening '/' represents the federated root, 'a' represents a repository beneath the federated root, 'b' is a hierarchy node within the 'a' repository, and 'c' is the node in question. The path can also identify a property ("property1") on a node:

/a/b/c.property1

In aspects of these embodiments, the path components occurring prior to the node name can be omitted if the system can deduce the location of the node based on context information.

In various embodiments, a schema defined in one repository or the VCR can inherit from one or more schemas defined in the same repository, a different repository or the VCR. In certain aspects of these embodiments, if one or more of the repositories implicated by an inherited schema do not support inheritance, the inheriting schema can be automatically defined in the VCR by the API. In one embodiment, the inheriting schema is defined in the VCR by default.

By way of illustration, the Employee schema located in the Avitech repository inherits from the Person schema located beneath the Schemas hierarchy node in the BEA repository:

Schema /Avitech/Employee inherits from /BEA/Schemas/Person = {
<Name=EmployeeID, Type= Number>,
<Name=DateofHire, Type=Date>,
<Name=Salary, Type= Number> }

In various embodiments, the link property type (see Table 1) allows for content reuse and the inclusion of content that may not be under control of the VCR. By way of illustration, the value associated with a link property can refer/point to any of the following: a content node in a VCR, an individual property on a content node in a VCR, a file on a file system, an object identified by a URL (Uniform Resource Locator), or any other suitable identifier. In various embodiments, when editing a content node that has a link property type, a user can specify the link destination (e.g., using a browser-type user interface). In certain aspects of these embodiments, if a link refers to a content node or a content node property that has been moved, the link can be resolved automatically by the system to reflect the new location.

In various embodiments, a value whose type is lookup (see Table 1) can hold an expression that can be evaluated to search the VCR for instances of content node(s) that satisfy the expression. Nodes that satisfy the expression (if any) can be made available for subsequent processing. In various embodiments, a lookup expression can contain one or more expressions that can substitute expression variables from: the content node containing the lookup property, a user profile, anything in the scope of a request or a session. In various embodiments, an expression can include mathematical, logical and Boolean operators, function/method invocations, macros, SQL (Structured Query Language), and any other suitable query language. In various embodiments, an expression can be pre-processed one or more times to perform variable substitution, constant folding and/or macro expansion. It will be apparent to those of skill in the art that many other types of expressions are possible and fully within the scope and spirit of this disclosure.

In various embodiments, when editing a content node that has a lookup property type, the user can edit the expression through a user interface that allows the user to build the expression by either entering it directly and/or by selecting its constituent parts. In addition, the user interface can enable the user to preview the results of the expression evaluation.

Database mapped property types (see Table 1) allow information to be culled (i.e., mapped) from one or more database tables (or other database objects) and manipulated through node properties. By way of illustration, a company might have "content" such as news articles stored as rows in one or more RDBMS (Relational Database Management System) tables. The company might wish to make use of this "content" via their portal implementation. Further, they might wish to manage the information in this table as if it existed in the VCR. Once instantiated, a content node property that is of the database mapped type behaves as though its content is in the VCR (rather than the database table). In one embodiment, all API operations on the property behave the same but ultimately operate on the information in the database table.

In various embodiments, a given database mapped property type can have an expression (e.g., SQL) which, when evaluated, resolves to a row and a column in a database table (or resolves to any kind of database object) accessible by the system over one or more networks. A database mapped property will be able to use either native database tables/objects or database views on those tables/objects. It will be appreciated by those of skill in the art that the present disclosure is not limited to any particular type of database or resolving expression.

In aspects of certain embodiments, a schema can be automatically created that maps to any row in a database table. The system can inspect the data structure of the table and pre-populate the schema with database mapped properties corresponding to columns from the table. The table column names can be used as the default property names and likewise the data type of each column will determine the data type of each corresponding property. The system can also indicate in the schema which properties correspond to primary key columns. If certain columns from the table are not to be used in the new schema, they can be un-mapped (i.e. deselected) by a user or a process. A content node can be based on such a schema and can be automatically bound to a row in a database table (or other database object) when it is instantiated. In various embodiments, a user can interactively specify the database object by browsing the database table.

While not required by all embodiments, some embodiments employ a display template (or "template") to display content based on a schema. Templates can implement various "views". By way of illustration, views could be "full", "thumbnail", and "list" but additional "views" could be defined by end-users. A full view can be the largest, or full page view of the content. A thumbnail view would be a very small view and a list view can be used when displaying multiple content nodes as a "list" on the page (e.g., a product catalog search results page). In various embodiments, the association between a schema and templates can be one-to-many. A template can be designated as the default template for a schema. In certain of these embodiments, templates can be designed with the aid of an integrated development environment (IDE). It is noteworthy that template technology is not limited to web applications. Other delivery mechanisms such as without limitation mobile phones, XML, and the like can be enabled by this technology.

In various embodiments and by way of illustration, display templates can be implemented using HTML (Hypertext Markup Language) and JSP (Java® Server Pages). By way of a further illustration, such a display template can be accessed from a web page through a JSP tag that can accept as an argument the identifier of a content node. Given the content node, the node's schema and associated default display template can be derived and rendered. Alternatively, the JSP tag can take an additional argument to specify a view other than the default. In another embodiment, display templates can be automatically generated (e.g., beforehand or dynamically at run-time) based on a content node's schema. In other embodiments, the view (e.g., full, thumbnail, list) can be determined automatically based on the contents of an HTTP request.

In various embodiments, a role is a dynamic set of users. By way of illustration, a role can be based on functional responsibilities shared by its members. In aspects of these embodiments, a role can be defined by one or more membership criteria. Role mapping is the process by which it is determined whether or not a user satisfies the membership criteria for a given role. For purposes of discussion, a role can be described as follows:

Role = PMembers + [Membership Criteria]

where PMembers is a set of user(s), group(s) and/or other role(s) that form a pool of potential members of this role subject to the Membership Criteria, if any. A user or a process can be in a role, if that user or process belongs to PMembers or satisfies the Membership Criteria. It is noteworthy that a user or process does not need to be a member of PMembers to be considered a member of the role. For example, it is possible to define a role with a criterion such as: "Only on Thursdays" as its membership criteria. All users would qualify as a member of this role on Thursdays. The Membership Criteria can include one or more conditions. By way of illustration, such conditions can include, but are not limited to, one or more (possibly nested and intermixed) Boolean, mathematical, functional, relational, and/or logical expressions. By way of illustration, consider the following Administrator role:

Administrator = Joe, Mary, SuperUser + CurrentTime > 5:00 pm

The role has as its potential members two users (Joe and Mary) and users belonging to the user group named SuperUser. The membership criteria includes a condition that requires the current time to be after 5:00 pm. Thus, if a user is Joe, Mary or belongs to the SuperUser group, and the current time is after 5:00 pm, the user is a member of the Administrator role.

In various embodiments, roles can be associated with Resource(s). By way of illustration, a resource can be any system and/or application asset (e.g., VCR nodes and node properties, VCR schemas and schema properties, operating system resources, virtual machine resources, J2EE application resources, and any other entity that can be used by or be a part of software/firmware of some kind). Typically, resources can be arranged in one or more hierarchies such that parent/child relationships are established (e.g., the VCR hierarchical namespace and the schema inheritance hierarchy). In certain of these embodiments, a containment model for roles is followed that enables child resources to inherit roles associated with their parents. In addition, child resources can override their parents' roles with roles of their own.

In various embodiments, Membership Criteria can be based at least partially on a node's properties. This allows for roles that can compare information about a user/process to content in the VCR, for example. In various embodiments, a node's property can be programmatically accessed using dot notation: Article.Creator is the Creator property of the Article node. By way of illustration, assume an Article node that represents a news article and includes two properties: Creator and State. A system can automatically set the Creator property to the name of the user that created the article. The State property indicates the current status of the article from a publication workflow standpoint (e.g., whether the article is a draft or has been approved for publication). In this example, two roles are defined (see Table 2).

TABLE 2

Exemplary Roles in an Embodiment

| ROLE NAME | ASSOCIATED WITH | PMEMBERS | MEMBERSHIP CRITERIA |
|---|---|---|---|
| Submitter | Article | Article.Creator | Article.State = Draft |
| Approver | Article | Editor | Article.State = (Submitted or Approved) |

The Submitter and Approver roles are associated with the Article node. Content nodes instantiated from this schema will inherit these roles. If a user attempting to access the article is the article's creator and the article's state is Draft, the user can be in the Submitter role. Likewise, if a user belongs to an Editor group and the article's state is Submitted or Approved, then the user can belong to the Approver role.

In various embodiments, a policy can be used to determine what capabilities or privileges for a given resource are made available to the policy's Subjects (e.g., user(s), group(s) and/or role(s)). For purposes of discussion, a policy can be described as follows:

Policy = Resource + Privilege(s) + Subjects + [Policy Criteria]

Policy mapping is the process by which Policy Criteria, if any, are evaluated to determine which Subjects are granted access to one or more Privileges on a Resource. Policy Criteria can include one or more conditions. By way of illustration, such conditions can include, but are not limited to, one or more (possibly nested and intermixed) Boolean, mathematical, functional, relational, and/or logical expressions. Aspects of certain embodiments allow policy mapping to occur just prior to when an access decision is rendered for a resource.

Similar to roles, in certain of these embodiments a containment model for policies is followed that enables child resources to inherit policies associated with their parents. In addition, child resources can override their parents' polices with policies of their own.

In various embodiments, policies on nodes can control access to privileges associated with the nodes. By way of illustration, given the following policies:

Policy1 = Printer504 + Read/View + Marketing
Policy2 = Printer504 + All + Engineering the Marketing role can read/view and browse the Printer504 resource whereas the Engineering role has full access to it ("All"). These privileges are summarized in Table 3. Policy1 allows a user in the Marketing role to merely view the properties of Printer504 whereas Policy2 allows a user in the Engineering role to view and modify its properties, to create content nodes based on Printer504 (assuming it is a schema), and to delete the resource.

TABLE 3

Exemplary Privileges for a "Printer504" Node in Various Embodiments

| ROLE | CREATE | READ/VIEW | UPDATE | DELETE |
|---|---|---|---|---|
| Marketing |  | x |  |  |
| Engineering | x | x | x | X |

Aspects of certain of these embodiments include an implied hierarchy for privileges wherein child privilege(s) of a parent privilege are automatically granted if the parent privilege is granted by a policy.

In various embodiments, the containment models for polices and roles are extended to allow the properties of a node to inherit the policies and roles that are incident on the node. Roles/polices on properties can also override inherited roles/polices. For purposes of illustration, assume the following policy on a Power property of Printer504:

Policy3 = Printer504.Power + Update + Marketing

In Policy3, the Marketing role is granted the right to update the Power property for the printer resource Printer504 (e.g., control whether the printer is turned on or off). By default, the Read/View property is also granted according to an implied privilege hierarchy. (There is no Browse privilege for this property.) See Table 4. Alternatively, if there was no implied privilege hierarchy, the Power property would inherit the read/view privilege for the Marketing role from its parent, Printer504. Although no policy was specified for the Power property and the Engineering role, the privileges accorded to the Engineering role can be inherited from a parent node. These privileges are summarized in Table 4.

TABLE 4

Exemplary Privileges for the "Power" Property in the "Printer504" Node

| ROLE | CREATE | READ/VIEW | UPDATE | DELETE |
|---|---|---|---|---|
| Marketing |  | X | x |  |
| Engineering | X | X | x | x |

In various embodiments, the ability to instantiate a node based on a schema can be privileged. This can be used to control which types of content can be created by a user or a process. By way of illustration, assume the following policy:

Policy4 = Press_Release + Instantiate + Marketing, Manager

Policy4 specifies that nodes created based on the schema Press_Release can only be instantiated by users/processes who are members of the Marketing and/or Manager roles. In aspects of certain of these embodiments, user interfaces can use knowledge of these policies to restrict available user choices (e.g., users should only be able to see and choose schemas on which they have the Instantiate privilege).

In various embodiments, policies can be placed on schemas. For purposes of illustration, assume the following policies:

Policy5 = Press_Release + Read/View + Everyone
Policy6 = Press_Release + All + Public_Relations

TABLE 5

Exemplary Privileges for the "Press Release" Schema

| ROLE | CREATE INSTANCE | READ/VIEW | UPDATE | DELETE |
|---|---|---|---|---|
| Everyone | | X | | |
| Public Relations | x | X | x | x |

With reference to Table 5 and by way of illustration, assume a content node instance was created based on the Press Release schema. By default, it would have the same roles/polices as the Press Release schema. If a policy was added to the node giving a role "Editor" the privilege to update the node, the result would be additive. That is, Everyone and Public Relations would maintain their original privileges.

In various embodiments, policies can be placed on properties within a schema, including property choices. (Property choices are a predetermined set of allowable values for a given property. For example, a "colors" property could have the property choices "red", "green" and "blue".)

Figure 2:
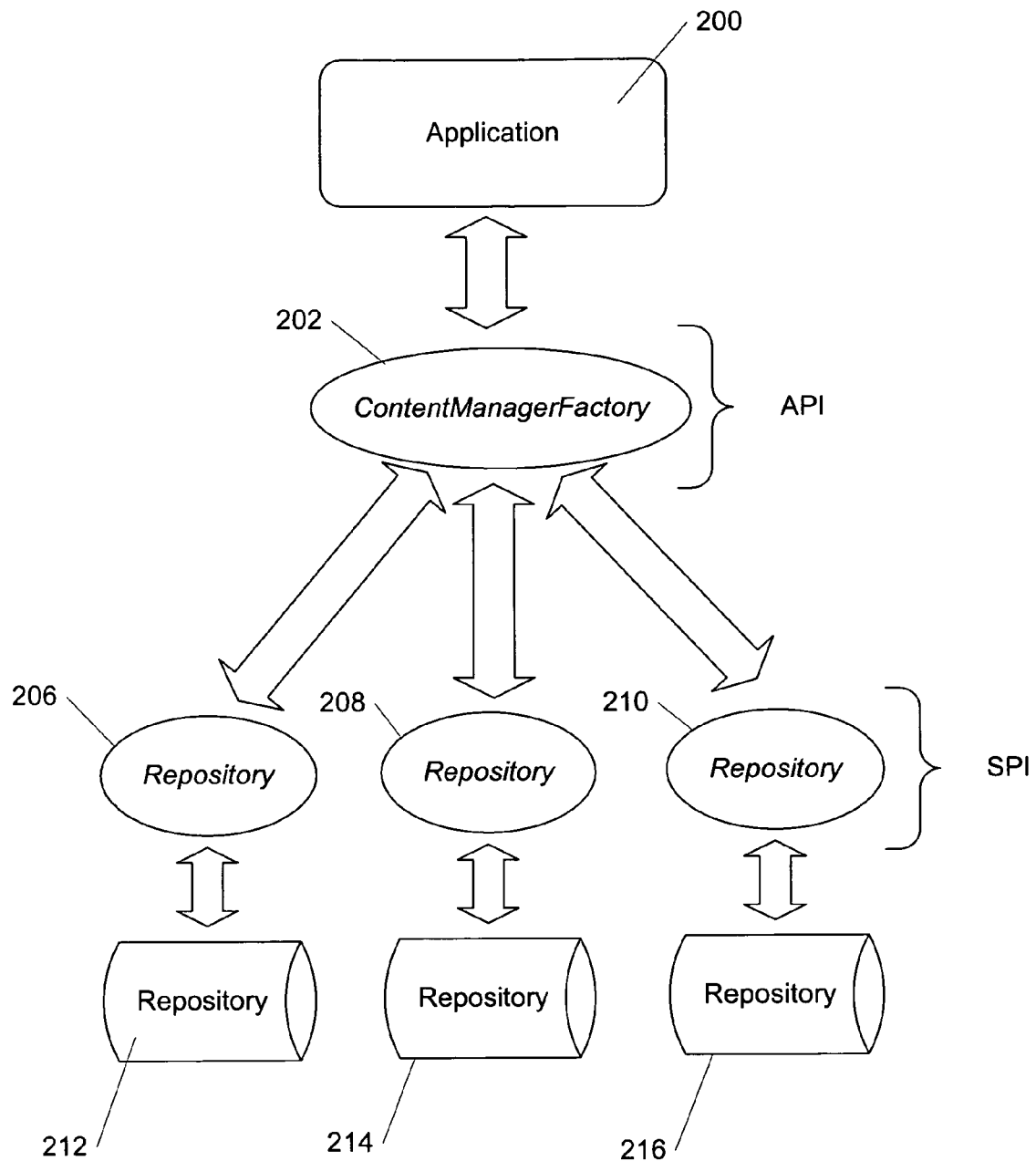
FIG. 2 is an illustration of objects/interfaces that can be used to interface repositories comprising content in various embodiments.

FIG. 2 is an illustration of objects/interfaces that can be used to interface repositories comprising content in various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The ContentManagerFactory 202 can serve as a representation of an access device from an application program's 200 point of view. In aspects of these embodiments, the ContentManagerFactory attempts to connect all available repositories to the device (e.g., 212-216); optionally with user or process credentials. In various embodiments, this can be based on the Java™ Authentication and Authorization Service (available from Sun Microsystems, Inc.). Those of skill in the art will recognize that many authorization schemes are possible without departing from the scope and spirit of the present disclosure. An SPI Repository object 206-210 represents each available content repository. In an embodiment, the ContentManagerFactory can invoke a connect( ) method on the set of Repository objects. It is noteworthy that, in some embodiments, the notion of "connecting" to a repository is not exposed to users. In various embodiments, the ContentManagerFactory returns a list of repository session objects to the application program, one for each repository for which a connection was attempted. Any error in the connection procedure can be described by the session object's state. In another embodiment, the ContentManagerFactory can connect to a specific repository given the repository name. In various embodiments, the name of a repository can be a URI (uniform resource identifier).

Figure 3:
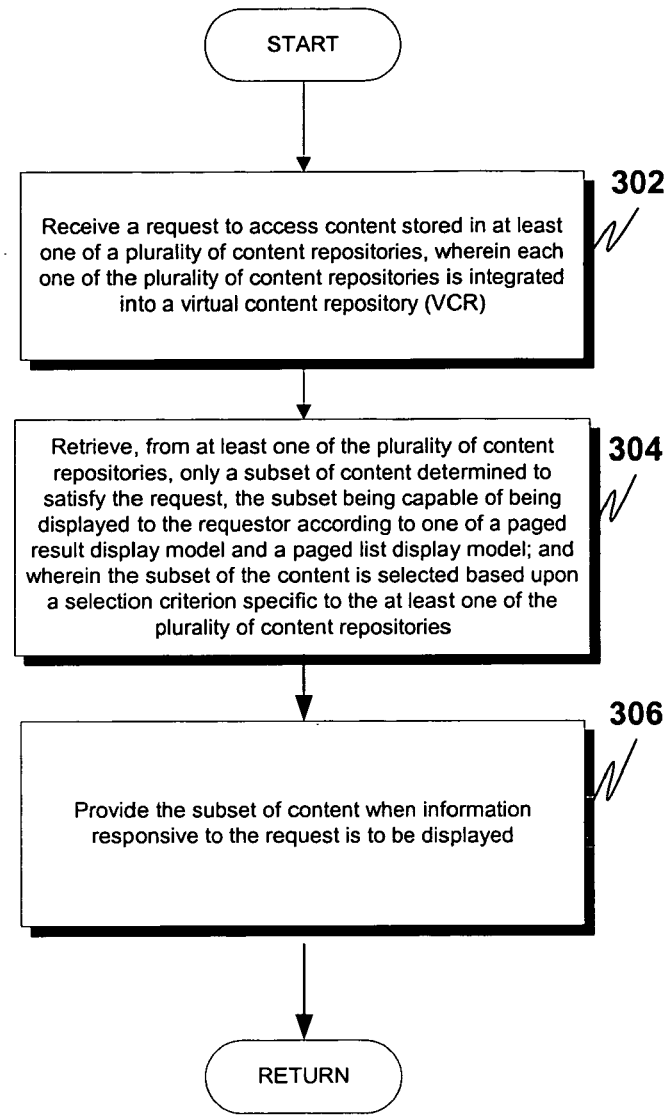
FIG. 3 is an operational flow diagram illustrating a high level overview of a technique lightweight loading for managing content in an embodiment.

FIG. 3 is an operational flow diagram illustrating a high level overview of a technique for providing lightweight loading for managing content in federated content repositories in an embodiment. As shown in FIG. 3, a request to access content stored in at least one of a plurality of content repositories is received (block 302). Each one of the plurality of content repositories is integrated into a virtual content repository (VCR). For example and without limitation, this can include receiving the request to access content stored in at least one of a plurality of content repositories from at least one of an administrator and a user. Only a subset of content determined to satisfy the request is retrieved from at least one of the plurality of content repositories (block 304). The subset is capable of being displayed to the requestor according to one of a paged result display model and a paged list display model. Further, the subset of the content is selected based upon a selection criterion specific to the at least one of the plurality of content repositories. By way of example and without limitation, this can include determining a subset of content that satisfies the request based upon a selection criteria selected from at least one of a paged result model and a paged list model. The subset of content is provided when information responsive to the request is to be displayed (block 306).

In an embodiment, an application making the request provides an indication of a desired selection criterion upon which selection from at least one of a paged result model and a paged list model is made.

In an embodiment the subset of content provided for display may be provided according to an ordering. The subset of content may be ordered according to one or more of a sorting, an ordering by repository, an ordering by a type of a node within the VCR, an ordering by a version identifier associated with at least a portion of the content, a custom sorting by node type-specific properties, a sorting by create/modification dates, and an ordering on multiple columns is also possible—for example, first by x, then by y, then by z, and so forth.

In an embodiment, a query to be applied to the subset of content is received. The subset of content is filtered according to the query to provide a filtered subset, which is provided responsive to the query.

In a yet further embodiment, the filtered subset of content may be provided according to an ordering. The filtered subset of content may be ordered according to one or more of: a sorting, an ordering by repository, an ordering by a type of a node within the VCR, an ordering by a version identifier associated with at least a portion of the content, and multiple levels of filtering are also possible—for example, filter where name starts with 'Fred' and type is 'Article' and modification date >X. Embodiments may also support the converse by providing the capability to filter a set of ordered content.

Some embodiments may also include redacting content received from the VCR prior to providing the content responsive to the request when the request does not satisfy the selected security policy. Alternatively, other embodiments may redact the request prior to accessing content in the VCR when the request does not satisfy the selected security policy. In another alternative approach, embodiments may block the request altogether when the request does not satisfy the selected security policy.

Embodiments may also provide the ability to provide results while transparently loading data in chunks, for example, a paged result.

In one embodiment, an initial query for both all query result IDs, and all query result Nodes is made. Everything is loaded into memory initially and no queries are made as pagination occurs. While such approaches have an advantage of providing everything in memory, these approaches can be computationally expensive in terms of speed and storage.

In an alternative embodiment, live query results are provided without temporary result-set storage. Initially, some but not all Node data is loaded. As pagination occurs, additional query(ies) may be made for additional Node data. For example, on pagination, retrieve all nodes on page 3 where NodeID>11000, NodeID<11500. In this approach, there is no need to temporarily store result set; access to first page of results is faster; and it will scale better in a server Java Virtual Machine (JVM) due to less memory for Node[ ]. However, the search result set can change while paginating, leading to duplicate or missing nodes.

In another alternative approach, a query is made for all result IDs both on paged result creation and anytime pagination occurs. When needed, a current page of Nodes is loaded. This approach has the advantage of supporting direct (random) access to specific pages. However, for wide queries, time to switch pages will be as long as time to resolve query result IDs, and increases as number of query results increases. It may take awhile to flip to the next page—time to load next page will be approx same as time to load first page. Server memory to store ID[ ] in Paged Result object and session replication may become issues. It is noteworthy that this can be addressed by supporting a Paged Result object with re-query capabilities. For example, only store the first X result set IDs, then if a pagination attempt occurs beyond the results, the query is re-issued and a different set of Ids is stored. A drawback of this approach is back-end resource consumption to service wide query may be increased.

In a yet further alternative embodiment, a query for result IDs is performed dynamically as needed. This may also be included in some embodiments as an optional feature. This approach initially loads some but not all ID data. As pagination occurs, a query for additional ID data is performed. For example, on pagination, retrieve third page of IDs for this query. An advantage of this embodiment is that more efficient back-end queries can be achieved since queries will be narrower, i.e., it will scale better for large queries. Also, this approach is expected to scale better in a server JVM due to less memory being required for each ID[ ]. Another advantage is that this approach should theoretically support any-size query results.

In a still further alternative embodiment, live query results with temporary result-set storage is provided. A query for all-pages of query result IDs is made initially, then query for one or more pages of result set Node data as pagination occurs. Disadvantages of this approach can include a need to store query result set ID[ ] somewhere (e.g., a database) and the full query result ID may require SPI resource consumption to be large for wide queries (lots of nodes) and server JVM memory consumption for ID[ ].

In a yet further alternative embodiment, the result set is stored in a database and the result set ID is stored in a Paged Result object. Disadvantages of this approach can include a need to age search results from database table so they don't accumulate over time and a need for temporary storage in the database. For an 'all nodes' query, this might be significant. The result set does not change as pagination occurs, so the Paged Result object references a snapshot in time. Advantage of this approach is the relatively small size of the Paged Result object.

In an embodiment, queries against SPI repositories will be limited by the current SPI architecture. To improve performance of the Extended SPI repositories (like a BEA repository), results paging is accomplished differently based on the repository type:

1. For BEA repository—provide live query results without temporary result-set storage by initially loading some but not all Node data. As pagination occurs, query for additional Node data. Otherwise, query for all result IDs both on paged result creation and anytime pagination occurs. When needed, load current page of Nodes if possible.

Extended operations take maximum results size
Extended operations retrieve results given pagination location
Security information is passed through Extended operations interfaces so it can be incorporated in the query
A new live Paged Result object is provided that internally stores only some nodes, store the ContentContext object in it
On paged result creation load one or several pages
When loading a page, directly query the CM interface to retrieve a specific bounded range of results.

2—For a non-BEA repository, provide live query results without temporary result-set storage by initially loading some but not all Node data. As pagination occurs, query for additional Node data.
Query to retrieve IDs
Create live Paged Result object (probably a different type) to internally store some IDs and some nodes.
In an embodiment, the Paged Result object performs additional ID queries on demand to help reduce memory consumption for the case where a large number of search results are retrieved. In that case, the ID[ ] could be smaller.

Embodiments employing the Java Database Connectivity (JDBC) API, and certain databases that support directly accessing results at a given index, may make use of a JDBC scrollable result set method—ResultSet.absolute(int rowNum) which supports moving the cursor to a given row number. Another alternative is to just call ResultSet.next( ) the appropriate number of times. JDBC and some databases support limiting the total number of results returned. JDBC has a Statement setMaxRows(int rowlimit) method. Oracle has a query hint to indicate that not all rows are expected to be examined. Queries can often be constructed using a 'not in . . . ' syntax to load a specific set of rows. Such concerns are often database specific.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for providing lightweight loading for managing content to federated content repositories as discussed herein.

Figure 4:
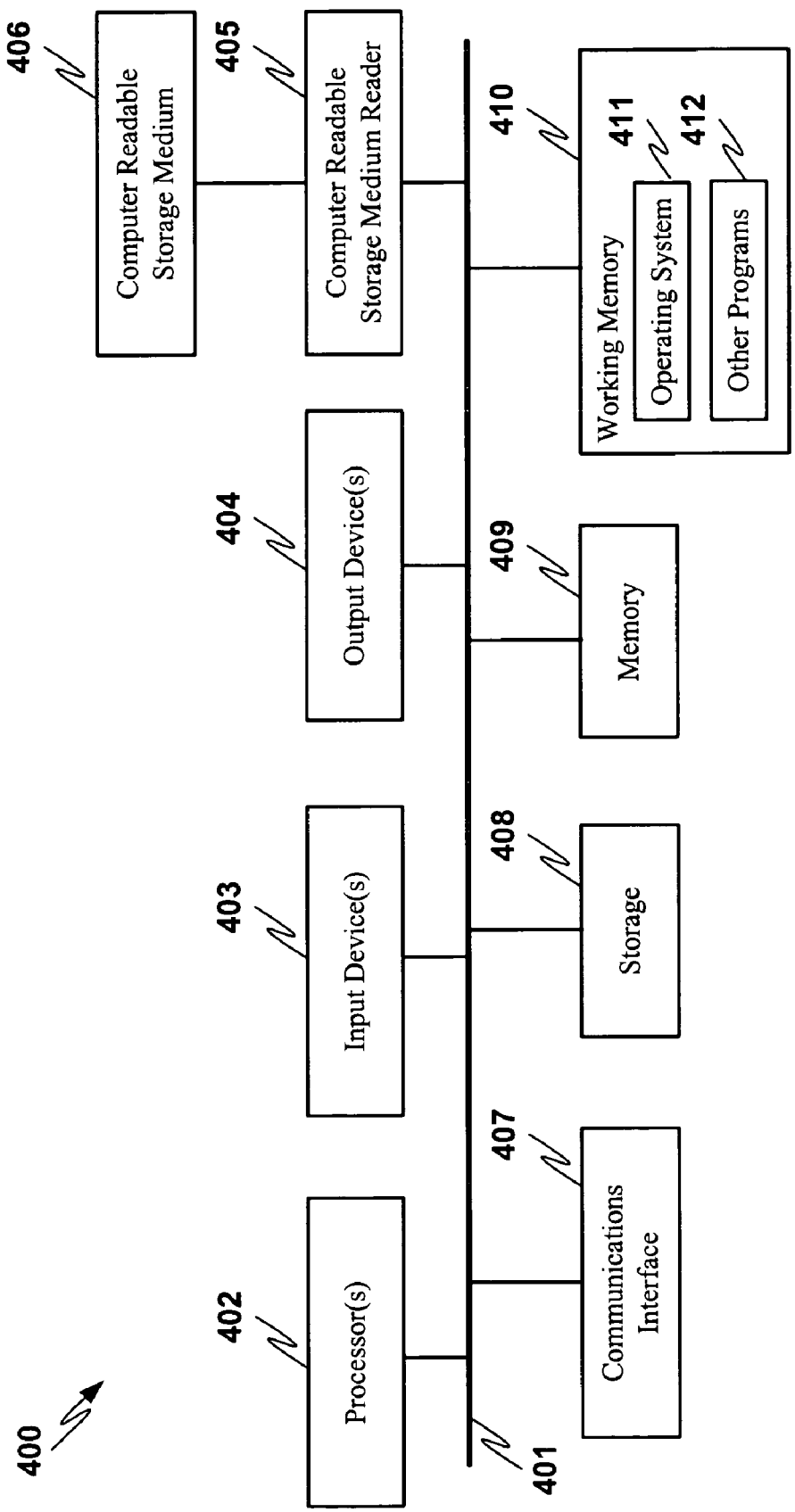
FIG. 4 is a hardware block diagram of an example computer system, which may be used to embody one or more components in an embodiment.

FIG. 4 illustrates a processing system 400, which can comprise one or more of the elements of FIG. 1. Turning now to FIG. 4, a computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for providing lightweight loading for managing content to federated content repositories in a content management system, the method comprising:
   receiving, from a requester, a request to access content stored in at least one of a plurality of content repositories, wherein each one of the plurality of content repositories is integrated into a virtual content repository (VCR);
   retrieving, from at least one of the plurality of content repositories, only a subset of content determined to satisfy the request, the subset being capable of being displayed to the requestor according to one of a paged result display model and a paged list display model; and wherein the subset of the content is selected based upon a selection criterion specific to the at least one of the plurality of content repositories using at least one of a page result model and a page list model, wherein
   the page result model is used in user interactive applications and allows a result set to be loaded in chunks rather than all at once, wherein each chunk of the result set is examined in its entirety, and each chunk of the result set is discarded before the request completes or is stored in a cache for subsequent examination; and
   the page list model is used in non-interactive applications and allows a virtual result set, which is a list of items that have no concept of page, to be loaded in chunks rather than all at once, wherein each chunk of the virtual result set is examined in its entirety, and each chunk of the virtual result set is discarded before the request completes or is stored in a cache for subsequent examination; and
   providing the subset of content when information responsive to the request is to be displayed.

2. The method of claim 1, wherein receiving a request to access content stored in at least one of a plurality of content repositories, wherein each one of the plurality of content repositories is integrated into a virtual content repository (VCR) includes:
receiving, the request to access content stored in at least one of a plurality of content repositories from a user.

3. The method of claim 1, wherein retrieving, from at least one of the plurality of content repositories, only a subset of content determined to satisfy the request, the subset being capable of being displayed to the requester according to one of a paged result display model and a paged list display model; and wherein the subset of the content is selected based upon a selection criterion specific to the at least one of the plurality of content repositories includes:
determining a subset of content that satisfies the request based upon a selection criteria selected from at least one of the paged result model and the paged list model.

4. The method of claim 1, wherein determining a subset of content that satisfies the request based upon a selection criteria selected from at least one of a paged result model and a paged list model includes:
receiving from an application making the request an indication of a desired selection criterion upon which selection from at least one of a paged result model and a paged list model is made.

5. The method of claim 1, wherein providing the subset of content when information responsive to the request is to be displayed includes:
providing the subset of content according to an ordering.

6. The method of claim 1, wherein providing the subset of content according to an ordering includes:
providing the subset of content ordered according to at least one of: a sorting, an ordering by repository, an ordering by a type of a node within the VCR, an ordering by a version identifier associated with at least a portion of the content, a custom sorting by node type-specific properties, a sorting by create/modification dates, and an ordering on multiple columns.

7. The method of claim 1, further comprising:
receiving a query to be applied to the subset of content;
filtering the subset of content according to the query to provide a filtered subset; and
providing the filtered subset responsive to the query.

8. The method of claim 1, further comprising:
providing the filtered subset of content according to an ordering.

9. The method of claim 1, wherein providing the filtered subset of content according to an ordering includes:
providing the filtered subset of content ordered according to at least one of: a sorting, an ordering by repository, an ordering by a type of a node within the VCR, an ordering by a version identifier associated with at least a portion of the content, and multiple levels of filtering.

10. The method of claim 1, wherein providing the subset of content when information responsive to the request is to be displayed includes:
providing a first portion of a result set for display while concurrently transporting a second portion of the result set for display.

11. A machine-readable storage medium storing one or more sequences of instructions for providing lightweight loading for managing content to federated content repositories in a content management system, which instructions, when executed by one or more processors, cause the one or more processors to carry out the steps of:
receiving, from a requester, a request to access content stored in at least one of a plurality of content repositories, wherein each one of the plurality of content repositories is integrated into a virtual content repository (VCR);
retrieving, from at least one of the plurality of content repositories, only a subset of content determined to satisfy the request, the subset being capable of being displayed to the requester according to one of a paged result display model and a paged list display model; and wherein the subset of the content is selected based upon a selection criterion specific to the at least one of the plurality of content repositories using at least one of a page result model and a page list model, wherein
the page result model is used in user interactive applications and allows a result set to be loaded in chunks rather than all at once, wherein each chunk of the result set is examined in its entirety, and each chunk of the result set is discarded before the request completes or is stored in a cache for subsequent examination; and
the page list model is used in non-interactive applications and allows a virtual result set, which is a list of items that have no concept of page, to be loaded in chunks rather than all at once, wherein each chunk of the virtual result set is examined in its entirety and each chunk of the virtual result set is discarded before the request completes or is stored in a cache for subsequent examination; and
providing the subset of content when information responsive to the request is to be displayed.

12. The machine-readable storage medium as recited in claim 11, wherein the instructions for carrying out the step of receiving a request to access content stored in at least one of a plurality of content repositories, wherein each one of the plurality of content repositories is integrated into a virtual content repository (VCR) include instructions for carrying out the step of:
receiving, the request to access content stored in at least one of a plurality of content repositories from a user.

13. The machine-readable storage medium as recited in claim 11, wherein the instructions for carrying out the step of retrieving, from at least one of the plurality of content repositories, only a subset of content determined to satisfy the request, the subset being capable of being displayed to the requester according to one of a paged result display model and a paged list display model; and wherein the subset of the content is selected based upon a selection criterion specific to the at least one of the plurality of content repositories include instructions for carrying out the step of:
determining a subset of content that satisfies the request based upon a selection criteria selected from at least one of the paged result model and the paged list model.

14. The machine-readable storage medium as recited in claim 11, wherein the instructions for carrying out the step of determining a subset of content that satisfies the request based upon a selection criteria selected from at least one of a paged result model and a paged list model include instructions for carrying out the step of:
receiving from an application making the request an indication of a desired selection criterion upon which selection from at least one of a paged result model and a paged list model is made.

15. The machine-readable storage medium as recited in claim 11, wherein the instructions for carrying out the step of providing the subset of content when information responsive to the request is to be displayed include instructions for carrying out the step of:
providing the subset of content according to an ordering.

16. The machine-readable storage medium as recited in claim 11, further comprising instructions for carrying out the step of:

provide the subset of content ordered according to at least one of: a sorting, an ordering by repository, an ordering by a type of a node within the VCR, an ordering by a version identifier associated with at least a portion of the content, a custom sorting by node type-specific properties, a sorting by create/modification dates, and an ordering on multiple columns.

17. The machine-readable storage medium as recited in claim 11, further comprising instructions for carrying out the step of:

receiving a query to be applied to the subset of content;

filtering the subset of content according to the query to provide a filtered subset; and providing the filtered subset responsive to the query.

18. The machine-readable storage medium as recited in claim 11, further comprising instructions for carrying out the step of:

providing the filtered subset of content according to an ordering.

19. The machine-readable storage medium as recited in claim 11, wherein instructions for carrying out the step of providing the filtered subset of content according to an ordering include instructions for carrying out the step of:

providing the filtered subset of content ordered according to at least one of: a sorting, an ordering by repository, an ordering by a type of a node within the VCR, an ordering by a version identifier associated with at least a portion of the content, and multiple levels of filtering.

20. The machine-readable storage medium as recited in claim 11, wherein instructions for carrying out the step of providing the subset of content when information responsive to the request is to be displayed include instructions for carrying out the step of:

providing a first portion of a result set for display while concurrently transporting a second portion of the result set for display.

21. An apparatus for providing lightweight loading for managing content to federated content repositories in a content management system, the apparatus comprising:

a processor; and one or more stored sequences of instructions which, when executed by the processor, cause the processor to carry out the steps of:

receiving, from a requester, a request to access content stored in at least one of a plurality of content repositories, wherein each one of the plurality of content repositories is integrated into a virtual content repository (VCR);

retrieving, from at least one of the plurality of content repositories, only a subset of content determined to satisfy the request, the subset being capable of being displayed to the requestor according to one of a paged result display model and a paged list display model; and wherein the subset of the content is selected based upon a selection criterion specific to the at least one of the plurality of content repositories using at least one of a page result model and a page list model, wherein the page result model is used in user interactive applications and allows a result set to be loaded in chunks rather than all at once, wherein each chunk of the result set is examined in its entirety, and each chunk of the result set is discarded before the request completes or is stored in a cache for subsequent examination; and the page list model is used in non-interactive applications and allows a virtual result set, which is a list of items that have no concept of page, to be loaded in chunks rather than all at once, wherein each chunk of the virtual result set is examined in its entirety, and each chunk of the virtual result set is discarded before the request completes or is stored in a cache for subsequent examination; and providing the subset of content when information responsive to the request is to be displayed.

* * * * *